Oct. 25, 1966
W. A. BARBER
3,281,282
PROCESS FOR PREPARING CARBON ELECTRODE HAVING
NOBLE METAL THEREON
Filed March 1, 1963
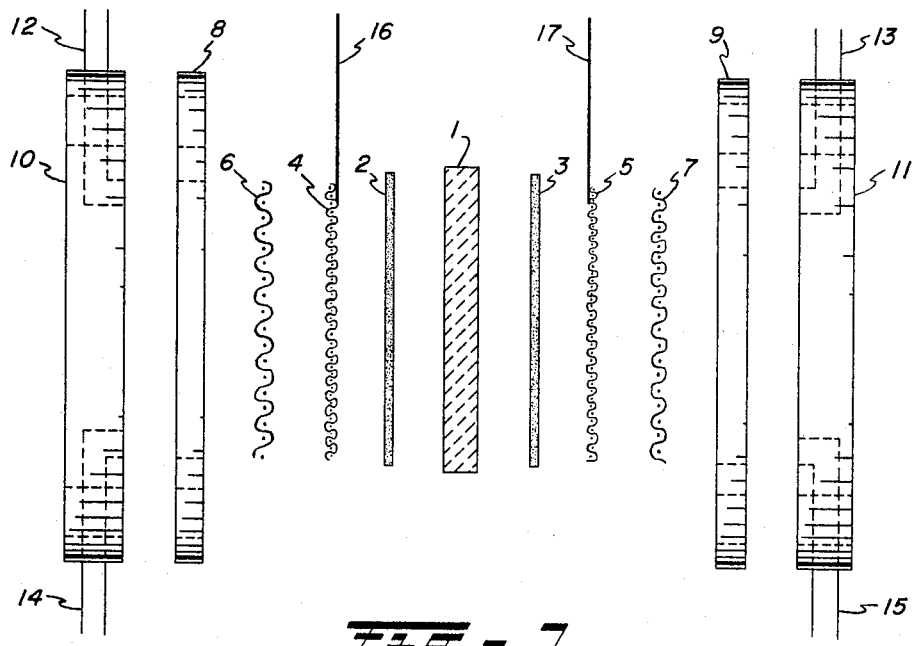
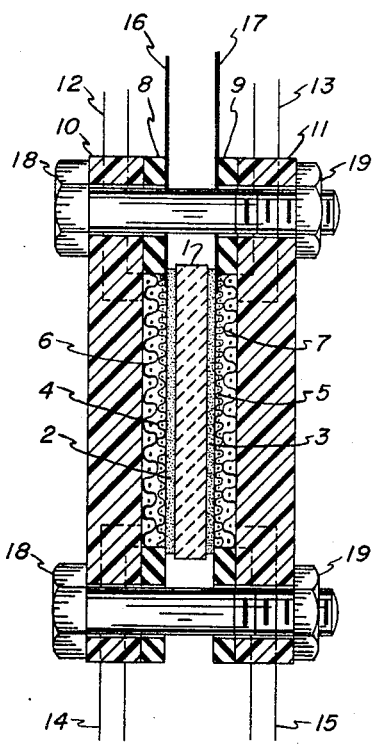
INVENTOR.
William A. Barber
BY Harry H. Kline
ATTORNEY 3,281,282
PROCESS FOR PREPARING CARBON ELECTRODE HAVING NOBLE METAL THEREON
William Austin Barber, Springdale, Conn., assignor to American Cyanamid Company, Stamford, Conn., a corporation of Maine
Filed Mar. 1, 1963, Ser. No. 262,108
7 Claims. (Cl. 136—122)

The invention relates to a novel method for preparing catalytic electrodes suitable for use in fuel cells. More particularly, it relates to an improved method for preparing catalytic electrodes from uniformly distributed metal catalyst on carbon. Still more particularly, the invention is concerned with an improved method for uniformly distributing catalytic materials on carbon in dispersion prior to electrode formation.

It is known that platinum catalyst can be deposited on carbon in aqueous dispersion prior to forming an electrode therefrom. This is accomplished usually in a direct manner by reducing or thermally decomposing a platinum compound, such as chloroplatinic acid, admixed with an aqueous dispersion of carbon with a reducing agent, such as hydrogen, formaldehyde or sodium borohydride, whereby platinum precipitates as a free metal. Unfortunately, this method often results in an undesirable form of the metal catalyst on carbon as observed in the electrodes' substantial failure when operating at current densities of more than 150 milliamperes per square centimeter. Thus, there remains a distinct need for preparing an electrode from uniformly distributed catalytic materials on carbon whereby the operation of a fuel cell is enhanced.

It is, therefore, a principal object of the present invention to provide a process whereby an improved electrode is provided. It is a further object to provide a process for preparing an electrode which functions at currents in excess of about 150 milliamperes per square centimeter by incorporating specially precipitated catalytic materials on carbon in dispersion prior to forming the electrode. Other objects and advantages will become apparent from a consideration of the ensuing description.

It has been unexpectedly found that a metal salt other than a noble metal compound and capable of being reduced in an aqueous menstruum, when initially reduced chemically in a carbon dispersion and finally displaced by a noble metal, markedly improves the catalytic activity of the noble metal distributed on the carbon. An electrode formed from a so-modified carbon surprisingly exhibits enhanced properties.

According to the process of the invention, a metal salt other than a noble metal compound and capable of being reduced in an aqueous environment is added and thoroughly admixed with an aqueous dispersion of carbon. A reducing agent is then admixed so as to effect reduction of the metal salt. Alternatively, the reducing agent can be initially admixed with the dispersed carbon and non-noble metal salt added thereto. Finally, a noble metal compound is added whereby the non-noble metal is displaced electrochemically by the noble metal.

In general, a wide variety of water-soluble, non-noble metal salts can be employed herein. Illustrative metal salts are: cadmium chloride, cadmium sulfate, cobalt chloride, cobalt bromide, cobalt iodide, stannous chloride, stannous bromide, cupric chloride, nickel acetate, ferric sulfate, and equivalents thereof. Usually, from about one percent to about fifty percent by weight of the metal salt, based on the weight of the carbon can be added.

Advantageously, any reducing agent can be employed herein. Illustrative agents are: hydrogen, sodium borohydride, potassium borohydride, formaldehyde and equivalents thereof. Sufficient reducing agent is employed to effect the required reduction.

In general, the carbon employed in the dispersion can be derived from any source, such as from coal, natural gas or petroleum. Graphites or lamp black may be used. The dispersing medium is water. Usually, the dispersion is formed when from one percent to ten percent of the carbon is added to water.

The noble metal compound employed herein can, for instance, include: chloroplatinic acid, potassium ethylene platinum chloride, palladium chloride, ruthenium bromide and equivalents thereof. From one percent to fifty percent can be advantageously employed, and usually from about two percent to twenty-five percent, based on the overall weight of the electrode, is a good operating procedure.

The electrode is prepared from a modified carbon either as an unsupported structure or preferably as a supported structure. As previously stated, carbon is modified by forming an aqueous dispersion of the same, adding a non-noble metal salt to the dispersion, chemically reducing the non-noble metal salt to precipitate the metal on the carbon, and adding the noble metal compound to electrochemically displace the precipitated non-noble metal. The latter modified carbon is washed with water to remove salts and is dried. It can then be rewetted with water to form an aqueous paste with a water-proofing agent, such as polytetrafluoroethylene, if desired, and either applied to a wire mesh backing or shaped without a backing and dried to remove water.

In order to further clarify the invention employing the specially prepared electrode hereinabove broadly defined, a preferred mode of operation in a typical fuel cell is shown in the accompanying drawing.

In the drawing:
FIG. 1 is an exploded plan view partially in section of a fuel cell employing the electrode of the present invention, and
FIG. 2 is a partially expanded side view, partially in section of the fuel cell of FIG. 1.

In FIG. 1, electrolyte saturated membrane 1 is positioned between electrodes 2 and 3 of this invention. Abutting the latter electrodes are current collector screens 4 and 5 which comprise stainless steel or other suitable inert metal. Stainless steel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as silicone rubber gaskets. These seal as well as separate the chambers containing reactants. Exterior to the gaskets are housing members 10 and 11 having inlet stainless steel or other inert metal tubing 12 and 13 through which hydrogen and oxygen are separately introduced into the fuel cell. Stainless steel tubing 14 and 15 are provided as vents for unused gases. Wire leads 16 and 17, connected onto current collector screens 4 and 5 are conductive members through which current flows from and to the fuel cell via the external circuit when the cell is in operation. The cell is secured by means of bolts 18 and nuts 19 as shown in FIG. 2.

The invention will be illustrated in conjunction with the following examples which are to be taken as illustrative only and not by way of limitation. All parts are by weight, unless otherwise stated.

EXAMPLE 1

Two parts of carbon (Nerofil Grade D) are suspended in 100 parts of distilled water and .0935 part of cadmium chloride is added to the suspension. The suspension is agitated at a constant rate for fifteen minutes. To the latter is added dropwise with agitation 0.079 part of sodium borohydride as a 5% aqueous solution. The mixture is brought to a boil, cooled down, filtered and washed until all traces of chloride ion are absent. The carbon containing the well-dispersed cadmium metal is reslurried in 100 parts of distilled water. Potassium ethylene platinum chloride (0.187 part), dissolved in distilled water, is added dropwise to the carbon suspension with agitation. The carbon suspension is next brought to a boil, cooled down, and filtered. The carbon is then washed until all traces of chloride ion are removed, and dried in a vacuum desiccator to obtain a powder.

A paste is formed from resultant platinum catalyst uniformly dispersed on carbon powder by adding water to the powder. Polyethylene latex is admixed therein and the latter is spread on a 84 x 84 mesh stainless steel wire backing to form the improved electrodes. A fuel cell is next assembled with the aforementioned electrodes and with a 5 N sulfuric acid electrolyte membrane. It is then operated by employing hydrogen and oxygen gas as fuel and oxidizer, respectively.

In the table hereinbelow, results using the above described two-step reduction procedure are compared with either sodium borohydride or formaldehyde in a direct, one-step noble metal compound reduction procedure.

TABLE I

| Reducing Agent | 5% Pt on Carbon | Volt at (ma./cm.²*)— | | | | | | |
|---|---|---|---|---|---|---|---|---|
| | | 20 | 40 | 60 | 80 | 100 | 150 | 200 |
| Sodium borohydride | Nerofil D | .73 | .66 | .60 | .55 | .48 | .32 | 0 |
| Formaldehyde | do | .78 | .71 | .65 | .60 | .54 | .40 | 0 |
| Cadmium (Example 1) | do | .78 | .72 | .67 | .63 | .58 | .48 | .37 |

*Milliamperes per square centimeter.

EXAMPLE 2

The procedure of Example 1 is repeated in every detail, except that 0.121 part of cobalt chloride is employed as the non-noble metal compound.

This sample is tested as in Example 1 with attendant results shown in Table II below.

TABLE II

| Reducing Agent | 5% Pt on Carbon | Volt at (ma./cm.²*)— | | | | | | |
|---|---|---|---|---|---|---|---|---|
| | | 20 | 40 | 60 | 80 | 100 | 150 | 200 |
| Sodium borohydride | Nerofil D | .73 | .66 | .60 | .55 | .48 | .32 | 0 |
| Formaldehyde | do | .78 | .71 | .65 | .60 | .54 | .40 | 0 |
| Cobalt (Example 2) | do | .78 | .72 | .67 | .63 | .56 | .46 | .31 |

*Milliamperes per square centimeter.

EXAMPLE 3

The procedure of Example 1 is repeated in every detail, except that palladium chloride is employed in lieu of chloroplatinic acid. When tested as in Example 1, results substantially as shown in Table I are noted.

EXAMPLE 4

Two parts of Nerofil Grade D carbon and 0.25 part of cobalt chloride hexahydrate are mixed with water in a thick paste and the paste dried in an oven at 110° C. The resulting black powder is reduced with hydrogen gas at 400° C. for thirty minutes. This sample of cobalt metal well dispersed on carbon is resuspended in an aqueous solution of 0.28 part of chloroplatinic acid to effect electrochemical exchange and deposit finely divided and well dispersed platinum on the carbon. The suspension is heated to boiling, cooled, filtered, washed and vacuum dried.

Electrodes prepared from resultant well dispersed platinum on carbon are tested as in Example 1 and similar results are recorded.

It is an advantage of the present invention that the electrodes are prepared in accordance with the process of the present invention exhibit markedly enhanced activity. Particularly is the desired effect noted when operating at high current densities.

I claim:

1. A process for preparing an improved electrode adapted for use in a fuel cell which comprises the steps of: preparing a dispersion of carbon in water, incorporating a non-noble metal salt therein, reducing the latter mixture to precipitate non-noble metal directly on the carbon in said dispersion, adding a noble metal compound thereto whereby the non-noble metal is electrolytically displaced, and forming an enhanced electrode from the resultant noble metal catalyst-containing carbon.

2. The process according to claim 1, wherein the non-noble metal salt is cadmium chloride.

3. The process according to claim 1, wherein the non-noble metal salt is cobalt chloride.

4. The process according to claim 1, wherein the noble metal compound is chloroplatinic acid.

5. The process according to claim 1, wherein the noble metal compound is palladium chloride.

6. The process according to claim 1, wherein the reduction of the non-noble metal salt is effected by means of sodium borohydride.

7. The process according to claim 1, wherein the reduction of the non-noble metal salt is effected by means of hydrogen.

References Cited by the Examiner

UNITED STATES PATENTS 2,662,831   12/1953   Culverhouse.
3,097,974   7/1963    McEvoy et al. _____ 136—86
3,183,124   5/1965    Jasinski _____ 136—122

WINSTON A. DOUGLAS, *Primary Examiner.*

A. B. CURTIS, *Assistant Examiner.*